United States Patent [19] [11] 3,963,814
Cospen et al. [45] June 15, 1976

[54] METHOD FOR HERMETICALLY SEALING A RIGID PANEL
[75] Inventors: Jean Cospen, Cachan; Bernard Baumann, Paris, both of France
[73] Assignee: Cebal GP, France
[22] Filed: June 23, 1975
[21] Appl. No.: 589,197

Related U.S. Application Data
[60] Continuation of Ser. No. 256,308, May 24, 1972, abandoned, which is a division of Ser. No. 110,964, Jan. 29, 1971, Pat. No. 3,713,956.

[30] Foreign Application Priority Data
Feb. 6, 1970 France............................ 70.04278

[52] U.S. Cl................................. 264/23; 156/73.1; 156/73.5; 264/229; 264/248; 264/271
[51] Int. Cl.²........................................ B29C 27/00
[58] Field of Search............ 264/23, 229, 248, 271; 156/73.1, 73.5

[56] References Cited
UNITED STATES PATENTS
| 2,772,017 | 11/1956 | Rieke | 220/265 |
| 3,022,814 | 2/1962 | Bodine | 156/73.1 |
| 3,167,210 | 1/1965 | Carney | 220/63 |
| 3,773,205 | 11/1973 | Keeler et al. | 156/73.1 |

Primary Examiner—Willard E. Hoag

[57] ABSTRACT

This invention is addressed to a new and improved method for sealing an opening in a rigid panel in which first and second sealing members are inserted into the opening in the rigid panel, and subjected to a first lateral mechanical tension, the members are then heated, preferably by ultrasonic heating means and then the members are subjected to a second mechanical tension.

5 Claims, 7 Drawing Figures

METHOD FOR HERMETICALLY SEALING A RIGID PANEL

This application is a continuation of Ser. No. 256,308, filed 5/24/72, now abandoned, which is a division of Ser. No. 110,964, filed 1/29/71, now U.S. Pat. No. 3,713,956, issued Jan. 30, 1973.

The present invention relates to a method and apparatus for hermetically fixing a member made of plastic material in an opening formed in a sheet or panel, which is, for example, formed of metal.

The method and apparatus of this invention is of particular importance when applied to the fixing of gripping members of plastic material on lids for metal cans, known as "easy opening" cans.

A certain number of methods have already been proposed for solving this problem. Generally, such procedures have involved the use of a sudden engagement of a reinforced part of the plastic material in a hole of the cover. However, the tightness of the seal thus obtained is insufficient for pressurized containers, such as cans for beverages containing gases dissolved therein, such as carbonated beverages.

Another such procedure involves molding the plastic material under pressure and in situ, or in transforming a preformed element of this material. In the case where injection molding is used, it is difficult to achieve quality manufacture at the very high production rates which are required for mass production, such as, for example, in the manufacture of lids for preserve cans.

A large number of arrangements are already known which permit the softening or the pasty or liquid fusion of thermoplastic materials under the action of an ultrasonic generator so as to obtain a localized welding or molding. The operative part of this apparatus, generally called the "nose", has a particular shape adapted to facilitate the transmission of ultrasonic waves to thermoplastic compositions. This operation is frequently carried out under high pressure.

When thermoplastic compositions obtained by injection molding are locally heated by the ultrasonic process, it has been found that the quality of the first molding has an influence on the final result of the operation. Under the constant pressure of the "nose", the variations in volume and density and also the inevitable irregularities of the molded parts which have undergone an ultrasonic treatment, result in a variation of the fusion conditions. Acting from the outside of the plastic composition toward the interior thereof, the pressure of the "nose" is constant during the heating and cooling. However, during the changes in physical status of the thermoplastic material, the pressure becomes variable in the composition and the results which are obtained become uncontrollable, even when using precise and constant ultrasonic cycles; it becomes impossible to obtain the degree of tightness which is required.

It is accordingly an object of this invention to provide a new and improved method and apparatus for hermetically fixing preformed thermoplastic elements in an opening formed in a panel in which the hermetic assembly is formed under the action of an applied internal mechanical tension which is adjustable as a function of the quality of the thermoplastic material and as a function of their state of plasticity.

This and other objects and advantages of the invention will more fully described hereinafter, and, for purposes of illustration, and not of limitation, an embodiment of the invention is shown in the accompanying drawings in which.

Figure 4:
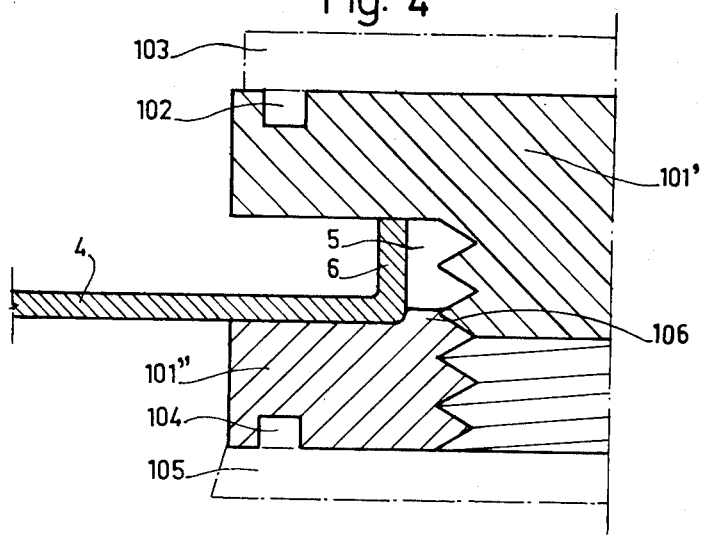
Figure 5:
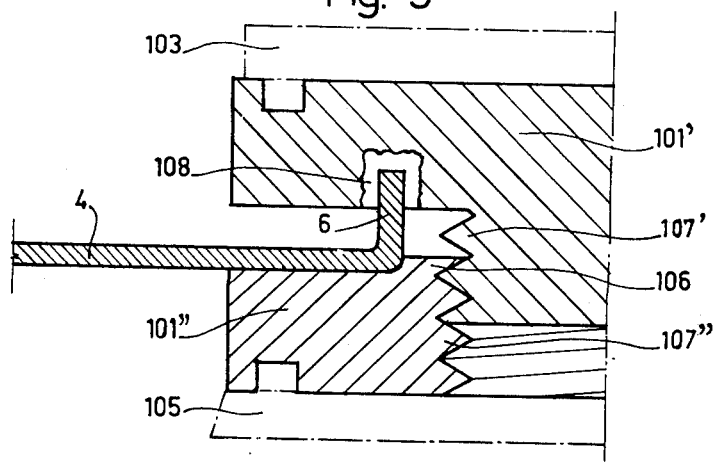
Figure 6:
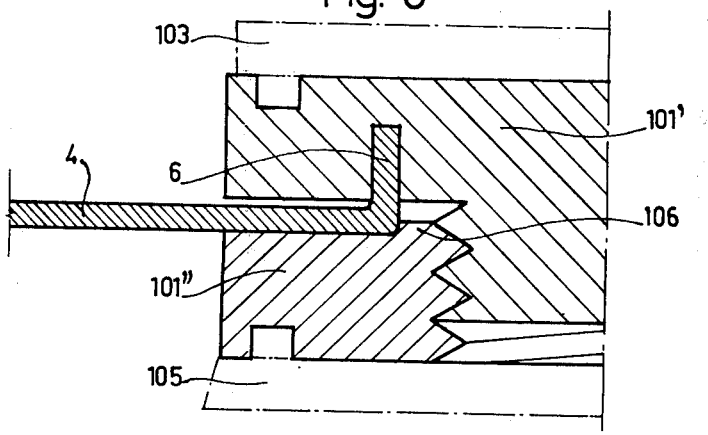
Figure 7:
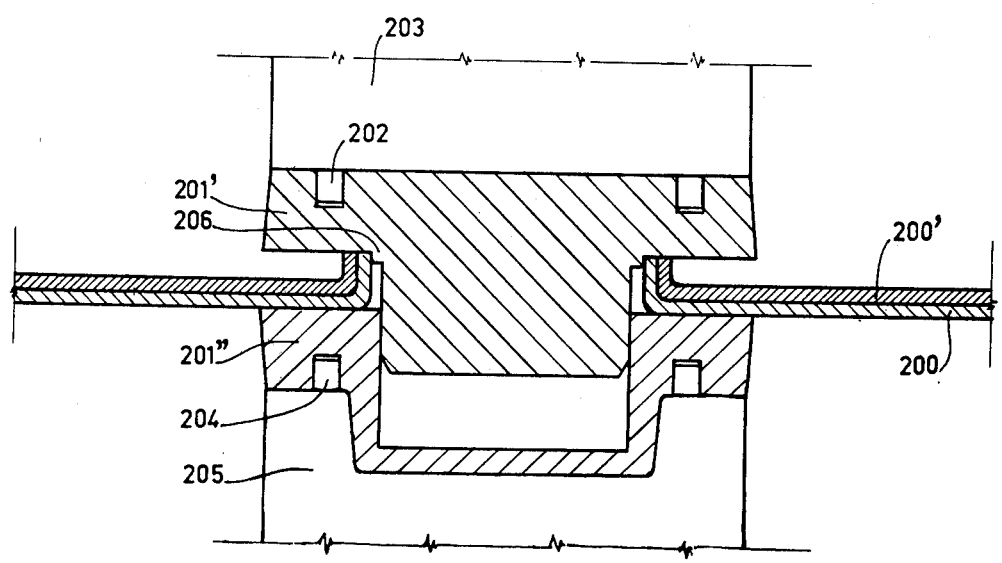

FIGS. 4 to 6, respectively, show a mean vertical section of a member made of plastic material at three successive moment during the operation; and, FIG. 7 is a sectional view illustrating the use of the member made of synthetic plastic for uniting two metal panels.

The method of this invention comprises forming the member of plastic material in two separate parts, uniting these two parts through the said opening in such a way that the rims of the opening are engaged between the rims of the parts of the member, under the action of an internal mechanical tension applied to the two parts relative to one another, subjecting the member to a heating by ultrasonic heating means and a second application of tension. This second application of tension is preferably carried out immediately after the ultrasonic heating. However, it can also commence before this heating is terminated.

According to one preferred embodiment of the invention, the application of internal mechanical tension is effected by the parts of the member made of plastic material being threaded one into the other with constant torques, the number of turns being adapted automatically in response to the dimensions and the density of the part to be threaded into the other.

The rim of the opening to be closed is preferably shaped so as to form a flange.

One of the two parts of the member can comprise a centering shoulder to facilitate its exact positioning in the opening to be closed.

The present invention also contemplates apparatus for carrying out the method as indicated. The apparatus comprises a threading means, the head of which has a driving means cooperating with one of the parts of the member made of plastic material, and an ultrasonic generator, the operative part of which carries a positioning device, which serves to block the other part of the member at the moment when the two parts are brought under tension in relation to one another. The reversal of the two members is also possible, that is to say, the "nose" can serve as the threading head.

Figure 1:
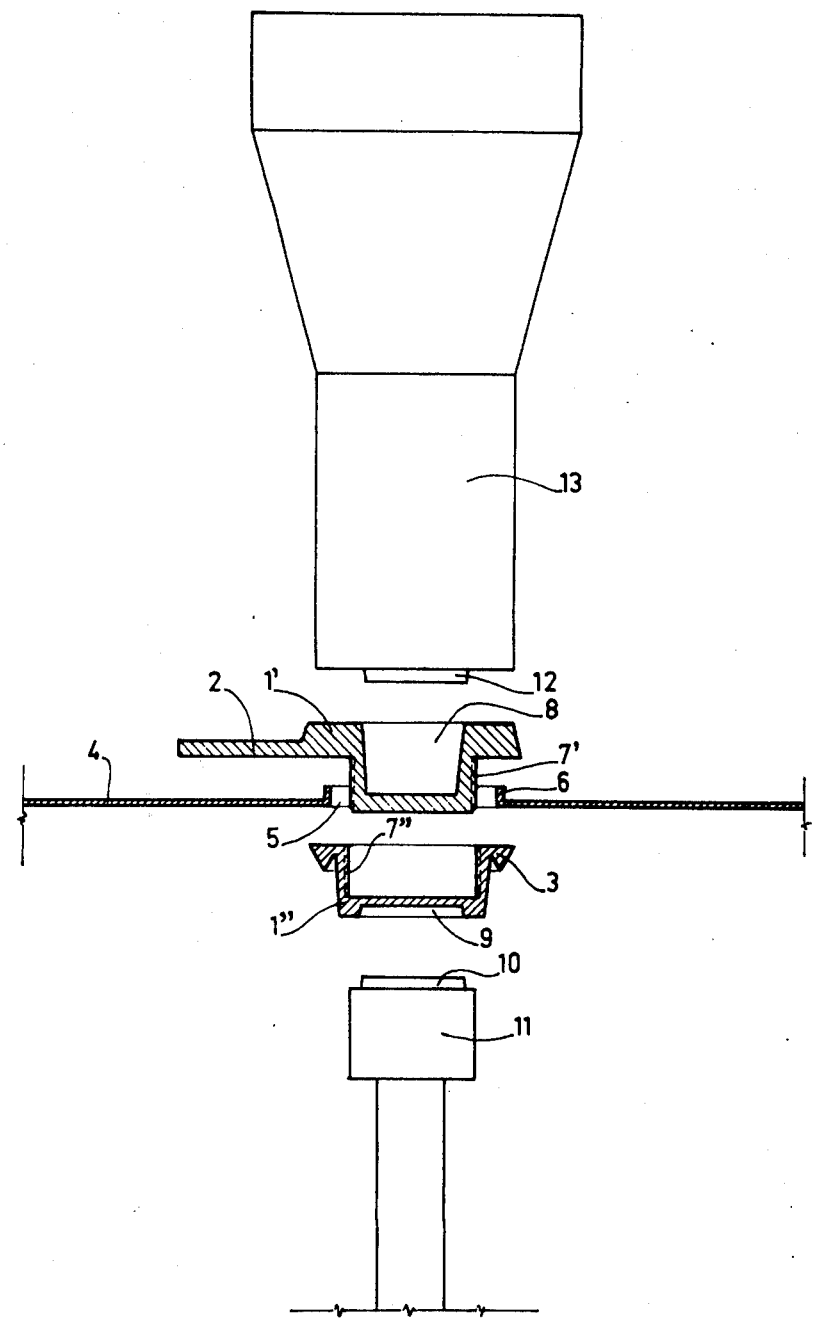
FIG. 1 is a partial vertical section of the fixing means before commencing the operation.
Figure 2:
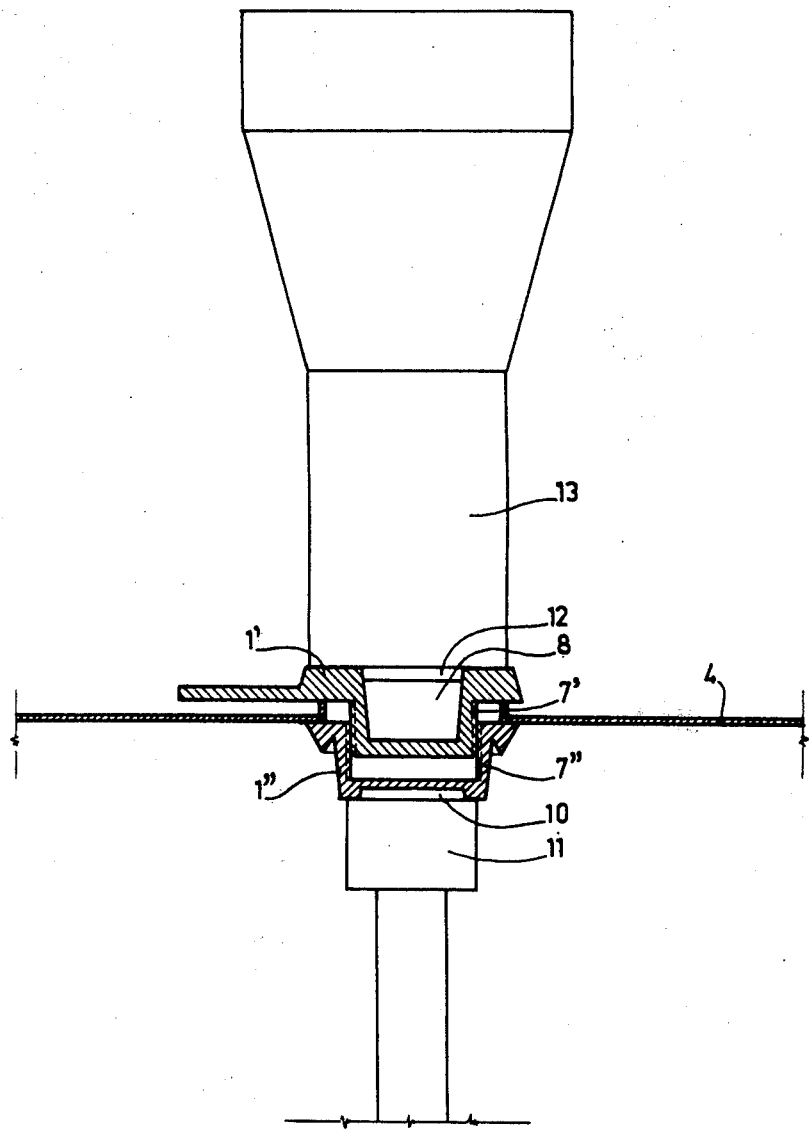
FIG. 2 is a similar partial section during the operation.
Figure 3:
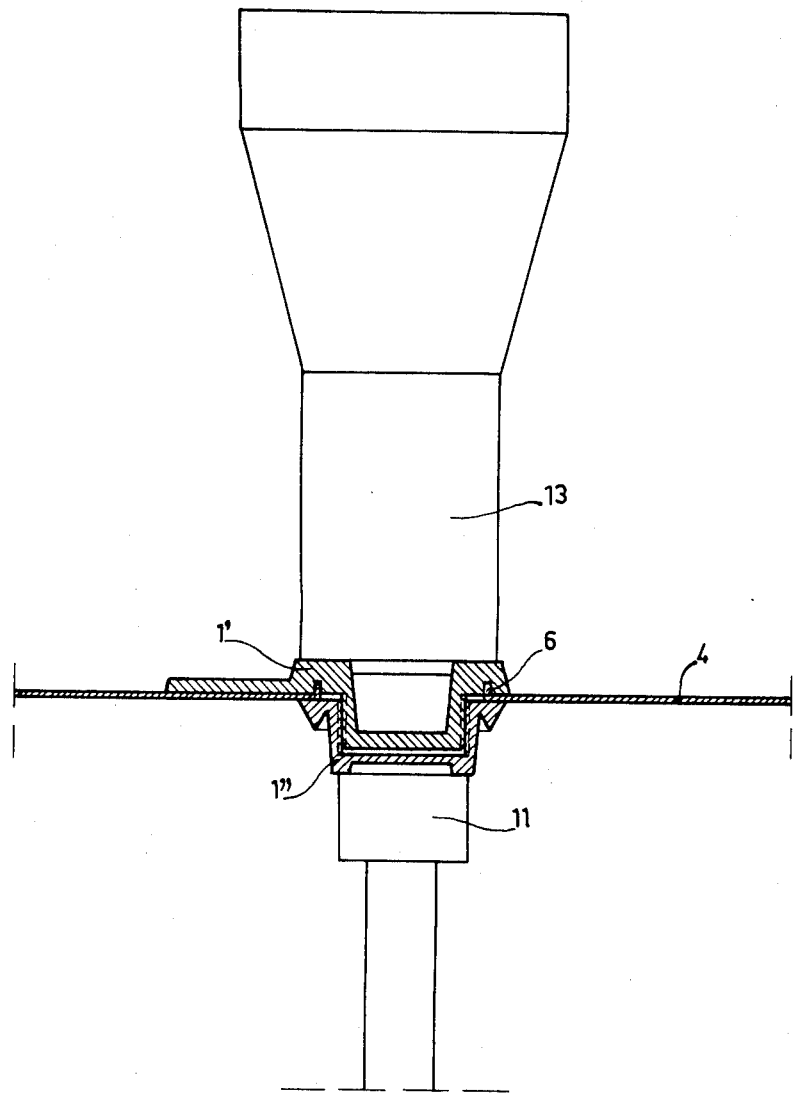
FIG. 3 is a similar partial section on completing the operation.

The first illustrative example, shown in FIGS. 1 to 3, shows the use of the method according to the invention for fixing an easy opening closure means provided, externally of the lid, with a gripping tongue, and having internally a retractable lip, which permits an opening of the can without tearing the member or the cover. This member can, for example, be made of a polyolefin, such as low-pressure polyethylene, polypropylene, etc.

According to the present invention, this closure member is formed of two parts 1' and 1", the first part 1' carrying the gripping tongue 2, while the second 1" is provided with a retractable lip 3 inside the can, of which the lid 4 is only partially shown. All the operations on the lid are carried out before it is crimped onto the can.

The opening 5 formed in the lid 4 is enclosed by a flange 6 which reinforces the adhesion of the closure device, particularly in the event of an accidental deformation of the lid.

To facilitate an understanding of the drawings, which are diagrammatic, the thickness of the panel 4 (about 0.25 mm) and the height of the flange 6 (about 0.5 mm) have been greatly enlarged relatively to the dimensions of the member made of plastic material which, in FIGS. 1 to 3, is reproduced approximately in its true dimensions.

The two parts 1' and 1'' of the member are shaped in such a manner that they can be threaded one into the other by means of screwthreads 7' and 7''.

For facilitating the threading operation, the external surfaces of the two parts 1' and 1'' are formed with recesses 8 and 9, respectively, which are of polygonal shape in the present example.

The recess 9 cooperates with the driving device 10 of the screwing head 11, while the recess 8 of the first part serves to receive a locking device 12 which is positioned at the point of the active part, referred to as the "nose" 13, of a conventional ultrasonic welding apparatus.

FIG. 1 shows the threading device 11 and the "nose" 13 clearly separated and in alignment therewith, the two parts 1' and 1'' of the plastic material member are placed on either side of the opening 5 in which the member is to be fixed.

The part 1'' is positioned on the screwing head so that the driving device 10 enters the recess 9 and the lid 4 is disposed thereabove. The threading device 10 and the "nose" 13 are moved towards one another, preferably by a downward movement of the latter.

A first tightening action with a precise coupling is effected by the threaded parts being engaged until the two elements 1' and 1'' of the member touch the rim of the opening in the lid. By utilizing the elasticity of the plastic material, however relative it may be, this first tightening action should be sufficient to permit a certain deformation of the part of the upper element 1', which is in contact with the lid and particularly with the flange 6. However, this tightening action should still not be too strong, so as not to hinder the vibration of the assembly and particularly the vibration of the lid.

On completing this first tightening action, when the position illustrated in FIG. 2 is reached, the ultrasonic generator is started up with a frequency chosen as a function of the characteristics of the materials to be joined, and their shape and volume, for example, of 20 kc/s with an amplitude of 25 microns for parts made of polypropylene. The vibration which is caused is transmitted to the part 1' and then to the lid, whereby the flange penetrates into the part 1', due to the softening undergone by the part of the plastic material which is in contact with the metal of the lid.

On completing the phase of ultrasonic transformation and before the cooling of the plastic material, a fresh tightening with precise coupling under the action of the threading head achieves the union of the two parts. The commencement of the second threading operation before completing the ultrasonic heating phase is not excluded. FIG. 3 shows the result which is obtained.

The three phases: tension — ultrasonics — tension, follow one another at very rapid rates, which are of the order of a fraction of a second. This explains why this method is particularly suitable for mass production.

A second example is illustrated in FIGS. 4 to 6, which show on a greatly enlarged scale a modified member adapted to be fixed to a panel.

The two parts of this member are in the form of a screw 101' and a nut 101''. The locking of the screw 101' is effected by means of studs 102 forming part of the ultrasonic "nose" 103 and the rotational driving movement of the nut 101'' is effected by the studs 104 forming part of the screwing head 105. The nut 101'' has a centering shoulder 106 which serves for accurately positioning the member to be fixed in the opening 5.

The cycle of the fixing method is shown in this example from the moment when the two parts 101' and 101'' of the member are just touching the panel 4 and the flange 6 and when the internal mechanical tension has just been caused by the engagement of the screwthreads 107' and 107'', and until the two parts of the element engage with the lid (FIG. 4).

At this moment, the ultrasonic generator is set in operation; as a consequence of the vibration which is generated, the flange causes a friction on the part in the form of a screw 101' and the zone 108 (shown in FIG. 5), which is in contact with it, starts to become softened. Since the assembly comprising screw 101' and nut 101'' is under internal mechanical tension, the flange 6 can penetrate into the head of the screw 101'.

In actual fact, the ultrasonic source, at a constant frequency F1 and constant amplitude A1, brought into contact under pressure (even if this pressure is small) with the upper part of the screw 101', generates within the plastic composition of this screw a vibration having a mean frequency F2 and a mean amplitude A2. The screw head transmits these vibrations to the metal panel which, in its turn, is caused to vibrate at a frequency F3 with an amplitude A3; finally, these vibrations return to the plastic composition, essentially at 108, with a frequency F4 and an amplitude A4. These two last parameters are variable, depending on the different physical status of the material during its transformation.

If at this moment there were no internal mechanical tension, such as that provided in the present invention, the pressure for causing the penetration of the flange would have to come from the "nose". It has already been indicated that this would result in a considerable modification of the ultrasonic action during its operational phase and during the cooling phase. Furthermore, with a too strong pressure of the "nose", there is a danger of the necessary vibrations being dampened.

By using the method according to the present invention, it has been found that the localized fusion of the thermoplastic material, mainly in the zone 108 at the point where it is in contact with the flange, but also with the remainder of the rim of the metal panel, is preceded by a very good cleaning effect between the faces to be welded; in addition, it permits a certain penetration of the material into the microscopic interstices of the surface of the metal, and this constitutes an initiation of the adherence. Finally, this fusion does not destroy the cohesion of the assembly of the molded part. After removal of the external stresses, the internal mechanical tensions and also the contractions inherent in the plastic material are maintained and the assembly provides a coherent and stable mass. Nevertheless, the effect of the ultrasonic treatment does not extend to the screwthreads and the two parts of the element remain separable.

However, by a proper choice of the dimensions of the parts of the member, and of the parameters of the ultrasonic action, it is possible to obtain, or not to obtain the localized fusion between the screwthreads of the two parts, so as to prevent any unthreading action.

When the position indicated in FIG. 6 is reached, that is to say, when the flange 6 has penetrated into the head of the screw 101', the ultrasonic generator is stopped and the screwing device gives a last tightening stroke, which completes the penetration of the flange 6 and at the same time, without any supplementary intervention, insures a cooling of the softened zone under a high internal tension.

It is obvious that the applications of this method are not limited by the examples which have already been given. Thus, the uniting of two superimposed metal sheets or panels 200 and 200', by means of an element made of thermoplastic material is illustrated in FIG. 7.

In this example, the element is composed of a screw 201' and a screwthreaded cap 201'', the first being immobilized by the studs 202 of the "nose" 203 and the second being driven by the studs 204 of the screwing head 205. In this example, it is the screw 201' which carries a centering shoulder 206.

The possible applications of the invention are not limited solely to the lids for preserve cans. The invention can be applied to all types of panels or sheets and also to the walls of hollow bodies, which are used in packaging or in any other sphere.

Although the invention has been described with reference to the union between plastic material and metal, the invention is not limited to this single development. For example, the metal can be replaced by one or more thermoplastic materials having a very different softening point from that of the member which extends through them. The same also applies as regards the panels of composite materials. In all these cases, it is also possible to use these elements as rivets for uniting two or more panels.

It will be apparent that various changes and modifications can be made in the details of construction, procedure and use, without departing from the spirit of the invention, especially as defined in the following claims.

We claim:

1. A method for hermetically sealing an opening in a panel, said panel being substantially rigid but capable of vibrating, comprising the steps of providing a pair of thermoplastic members capable of being heat sealed to said panel and adapted to be threadedly engaged one to the other, positioning each of the members in the opening whereby portions of the members engage opposite sides of the panel adjacent the opening, and threadably engaging one element with the other about an edge of the opening to generate an internal tension between said members while leaving the panel free to vibrate, applying ultrasonic vibration to said members to heat and soften thermoplastic material adjacent to the opening, and subjecting the members to a second mechanical tension by further threading one member into the other, whereby the members are heat sealed to the panel adjacent to the opening while leaving threads of said members free from located fusion.

2. A method as defined in claim 1 wherein the members are subjected to the second mechanical tension immediately after heating of the members.

3. A method as defined in claim 1 wherein the members are subject to the second mechanical tension prior to the completion of the heating.

4. A method as defined in claim 1 wherein the threading of the members is effected by constant torque.

5. A method as defined in claim 1 wherein the panel is formed with a raised flange about the opening whereby at least one of the members become embedded in the flange.

* * * * *